Patented July 27, 1943

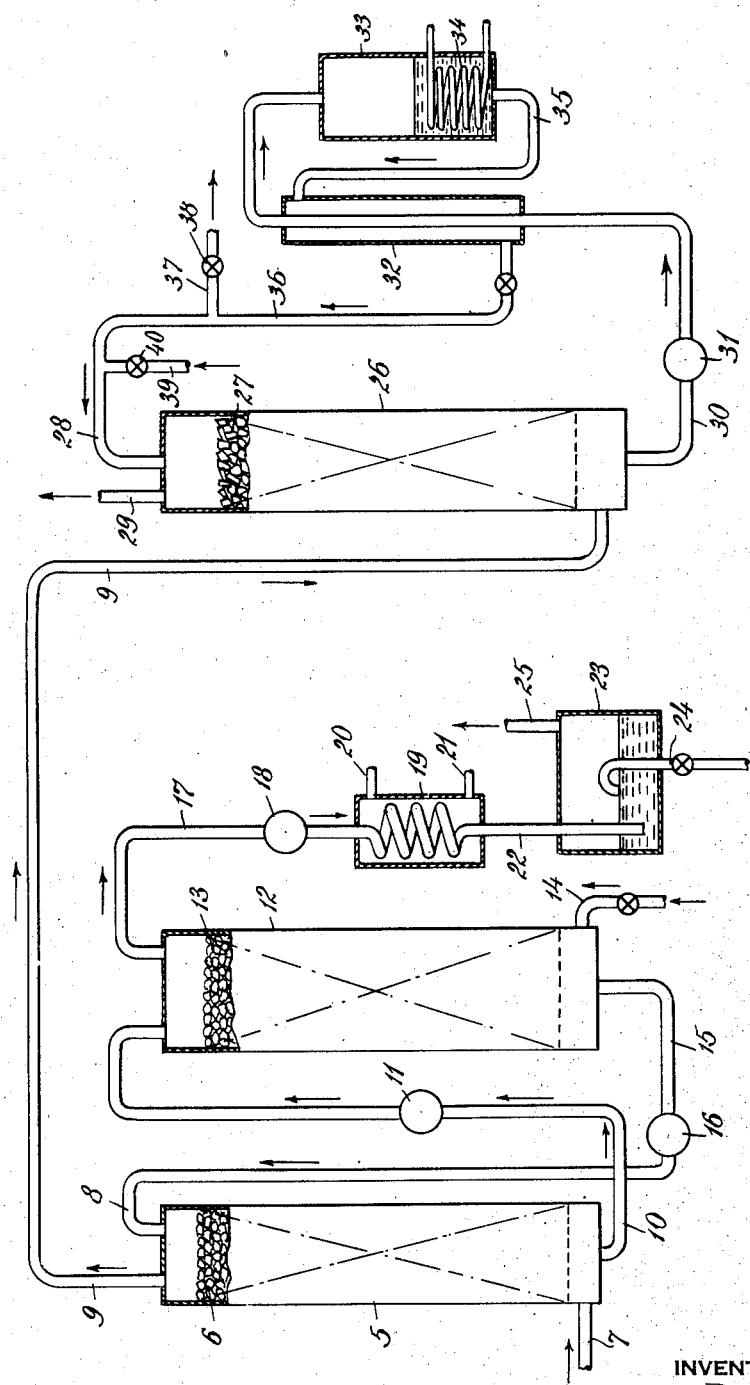

2,325,576

UNITED STATES PATENT OFFICE 2,325,576

RECOVERY OF OLEFIN OXIDES

Frederick R. Balcar, Stamford, Conn., assignor, by mesne assignments, to U. S. Industrial Alcohol Co., New York, N. Y., a corporation of West Virginia Application July 25, 1940, Serial No. 347,425

4 Claims. (Cl. 260—348)

This invention relates to the recovery of olefin oxides from gaseous mixtures, particularly such as are produced by the direct oxidation of olefins with air or oxygen.

In the direct oxidation of olefins such as ethylene, propylene and the like, the resulting gaseous mixture contains relatively small amounts, from 1% to 2% for example, of the olefin oxide, together with large proportions of inert or diluent gases such as oxygen, nitrogen, carbon dioxide and unoxidized olefins. The recovery of the olefin oxide from such a gaseous mixture presents numerous difficulties, and unless conducted in an efficient manner, the recovery may prove to be so costly as not to warrant practical and commercial operations.

It is known that olefin oxides may be separated from gaseous mixtures by absorption in water, which is an effective solvent. Thereafter, the olefin oxide can be separated from the water solution by treating the solution with steam. With the relatively dilute mixtures of the character hereinbefore indicated, it is necessary, if all of the olefin oxide is to be recovered, to use relatively large volumes of water. The treatment of such volumes of water with steam involves a considerable expense. This expense may be reduced to some extent if only a portion of the olefin oxide is separated from the gaseous mixture by absorption in water, because a considerable proportion of the olefin oxide can thus be recovered in much smaller volumes of water. This, however, entails a considerable loss of the olefin oxide, which more or less balances the saving due to the reduction in the amount of steam required to release the olefin oxide from the water. Consequently, there is no commercial advantage in proceeding in this manner.

It is the object of the present invention to afford a method of recovering olefin oxides from gaseous mixtures in which the olefin oxides exist in relatively small proportions in a commercially practicable and efficient manner.

A further object of the invention is the provision of a method in which a large proportion of the olefin oxides in a gaseous mixture may be separated as such and the balance recovered after conversion of the remaining olefin oxide to the corresponding glycol, so that losses of the olefin oxides are avoided and at the same time the procedure is conducted to minimize the cost of recovery.

Other objects and advantages of the invention will be apparent as it is better understood by reference to the following specification and the accompanying drawing, which illustrates diagrammatically apparatus capable of use in the application of the invention.

Numerous uses for olefin oxides are being developed, and the requirements for such oxides are increasing. Heretofore, much of the ethylene oxide produced has been converted into glycol, because recovery in this form is simpler and less costly than recovery of the olefin oxide without conversion. It is desirable, therefore, to afford an inexpensive method whereby the major part of the olefin oxide produced by direct oxidation of olefins can be separated without conversion to glycol, the balance being nevertheless recovered in a commercially available form. The method as hereinafter described permits such recovery and material savings in the treatment of the gaseous mixture.

In carrying out the invention, the gaseous mixture, including relatively low proportions of the olefin oxide, is scrubbed in any suitable apparatus with water. From 75% to 80% of the olefin oxide present in the gaseous mixture can be dissolved readily in a relatively small volume of water which is maintained preferably near room temperature or somewhat higher if desired. A temperature of from 25° to 30° C. is satisfactory. No attempt is made to separate all of the olefin oxide from the gaseous mixture at this stage, the balance of the gaseous mixture being subsequently treated to effect the conversion to glycol of the olefin oxide remaining therein so that the inert gases may be discharged eventually substantially free from the olefin oxide.

After solution of the olefin oxide in water, the latter is subjected to the action of steam. If steam were simply introduced to the solution, a large part of it would be condensed, and there would be an excessive heat requirement in raising the temperature of the water to that of the steam. This can be avoided, however, by introducing steam at a pressure so low that no appreciable condensation of the steam in contact with the absorbing liquor results. The temperature of the absorbing liquor is not altered appreciably by this operation, and the heat requirement becomes relatively insignificant. The olefin oxide mixed with the steam leaves the expelling chamber and is compressed to atmospheric pressure. It may be conducted then through a suitable condenser and cooled to the required temperature to condense the steam, whereupon the olefin oxide can be removed and conveyed to suitable storage receptacles.

Meanwhile, the balance of the gaseous mixture still containing small proportions of the olefin oxide is conveyed to a second absorbing chamber containing water, and a suitable hydration catalyst. As a catalyst, I preferably employ an acid such as sulphuric acid at a concentration of about 0.5% by weight. Hydrochloric acid in similar concentration may be used, but requires a somewhat higher temperature. Phosphoric acid in low concentration is also an effective hydration catalyst. Hydration may be effected even without a catalyst, but proceeds more effectively in the presence of a suitable acid.

After the balance of the olefin oxide has been absorbed in the acidulated water, the residue of inert gases may be discharged. The solution is then conducted preferably through a heat exchanger to a heating chamber where it is subjected to temperatures adapted to effect the completion of the hydration, for example from 20° to 70° C. It should be noted that if it is desired to operate the absorber and the hydrator at the same temperature, the heat interchanger may be omitted. The resulting solution containing glycol can be recirculated through the absorber and when the concentration of glycol is sufficient, a portion of the solution may be withdrawn, from which the glycol can be separated readily.

From the foregoing, it will be understood that I employ in the operation the two separate steps of absorption employing media in the minimum quantities to effectively recover all of the olefin oxide present in the gaseous mixture. In the initial step, the major part of the olefin oxide is recovered as such without the necessity of employing excessive volumes of water or of steam to effect the separation. Substantially all of the balance of the olefin oxide is recovered after it has been subjected to hydration. The remaining olefin oxide is readily absorbed in water containing a hydration catalyst such as an acid, and consequently such an absorption agent can be circulated and will become progressively concentrated in the hydration product while substantially all of the olefin oxide is separated from the gaseous mixture and is recovered in the hydrolyzed form.

The invention will be better understood by reference to the drawing, in which 5 indicates a tower containing packing material 6 adapted to provide contact between the liquid and gas entering the tower. The gaseous mixture containing the olefin oxide enters the tower 5 through a pipe 7 and passes upwardly in contact with water which enters the top of the tower through the pipe 8. A portion of the olefin oxide is absorbed and the balance of the gaseous mixture escapes through a pipe 9. The water containing olefin oxide leaves the tower at the bottom through a pipe 10 and is delivered by a pump 11 to the top of a tower 12 which is likewise filled with packing material 13 adapted to ensure surface contact between the liquid and steam which is introduced through a pipe 14 at the bottom of the tower. Water from the bottom of the tower 12 is withdrawn through a pipe 15 and delivered by a pump 16 to the pipe 8 and thus returns to the tower 5.

The steam and olefin oxide are withdrawn through a pipe 17 by means of a pump 18 which maintains in the tower 12 a sub-atmospheric pressure so low that the temperature of the water in the tower is not substantially altered by the steam which is introduced thereto. The pressure may be from a fraction of one pound to five pounds absolute. At such pressures there is substantially no heat transfer from the steam to the water, and consequently no loss of heat in raising the temperature of the water. The steam passes through the tower, effecting the release of the olefin oxide, and escapes thereafter through the pipe 17 and pump 18 which delivers the mixture to a condenser 19. Here the mixture is cooled by any suitable cooling medium such as water introduced through a pipe 20 and withdrawn through a pipe 21. The condensed steam and the olefin oxide pass through a pipe 22 into a trap 23 from which water resulting from the condensation of steam may be withdrawn from time to time as required through a syphon discharge pipe 24. The olefin oxide is withdrawn through a pipe 25 and may be delivered to any suitable storage receptacle.

The gaseous mixture containing the residue of the olefin oxide is delivered by the pipe 9 to a column 26 which contains packing material 27 adapted to ensure surface contact between the entering gas and the liquid in the tower. The gas enters the bottom of the tower and travels upwardly in contact with liquid supplied through a pipe 28 at the top of the tower. The residue of inert gas escapes through a pipe 29.

The liquid supplied to the tower 26 is preferably acidulated water, as hereinbefore described. It is an effective absorbent for the olefin oxide and will readily separate substantailly all of the relatively small portion of olefin oxide in the gas delivered through the pipe 9. The liquid is delivered through a pipe 30 and pump 31 to a heat exchanger 32 and thence to a chamber 33 where its temperature is regulated by any suitable means such as a coil 34 at a temperature of for example between 20° and 70° C. If sulphuric acid is used as a catalyst, a temperature of from 20 to 70° C. is sufficient, and the hydration is completed in less than a half hour. Hydrochloric acid may be used as the catalyst if desired and the temperature may be adjusted so that the hydration is completed in a similar period of time. After heating, the solution is withdrawn through a pipe 35 and after passing through the heat exchanger 32 where heat is transferred to the incoming solution, it passes through a pipe 36 and returns through the pipe 28 to the tower 26, absorbing there more of the olefin oxide and again passing through the cycle, until the solution has been enriched sufficiently in the hydrolyzed product.

At this point, a portion of the solution may be withdrawn through a pipe 37 controlled by a valve 38, and fresh solution may be introduced through a pipe 39 controlled by a valve 40 to balance the amount withdrawn from the system.

The advantages to be gained by the operation of the method may be illustrated as follows:

In a gas stream of about 180 cu. ft./hr., such as that issuing from the reaction chamber of a unit producing ethylene oxide, by the oxidation of ethylene, there may be for example 156 grams of ethylene oxide. If water at 25° C. is saturated with this gas, a gallon of the saturated solution will contain about 15 grams of ethylene oxide. It is seen that 10.4 gallons of the solution would hold all the ethylene oxide contained in 180 cu. ft. of the gas in question, if this volume of water could be saturated with the gas. Theoretically this could be accomplished if those volumes of water and gas were passed counter-current through a scrubbing tower of infinite length.

However, in a finite tower the water will not emerge completely saturated with the gas, and hence the gas emerging will contain unabsorbed ethylene oxide, the amount of which will vary with the efficiency of the tower. In ordinary plant practice using the theoretical quantity of water, not more than 70 to 80% of the ethylene oxide would be absorbed. To obtain 98% or more absorption of the ethylene oxide three to four times the theoretical amount of water is ordinarily required.

In the stripping column for the removal of the dissolved ethylene oxide from the water, a similar condition exists. Assuming a given volume of ethylene oxide solution entering the top of a stripping column of infinite length, a fixed amount of steam would be necessary to obtain complette removal of the ethylene oxide, as a mixture of ethylene oxide and steam. To obtain 98% or more removal of the ethylene oxide from the water three to four times this theoretical amount of steam would be necessary in ordinary plant practice.

It is evident that in actual operation to obtain 98% or more recovery of the ethylene oxide in the gas, since excess water in the amount indicated is necessary, and since excess steam must be supplied for all the water used, the steam requirement is 9 to 16 times greater than that theoretically required if both an ideal scrubber and an ideal stripper were used.

If the stripping operation is carried out under reduced pressure, a correspondingly greater expenditure of power would be required to compress the steam and ethylene oxide to atmospheric pressure.

By operating according to the present method in which the water supplied to the absorbing tower is sufficient for only 70 to 80% or less recovery of the ethylene oxide in the gas, and using only that steam required for a correspondingly low recovery of the dissolved ethylene oxide, the steam and power required per unit weight of ethylene oxide recovered may be as little as one-tenth of that required to give an over-all recovery of 98% or more of the original ethylene oxide content of the gas. This represents an important advantage and saving not only in the expenditure for steam and power, but in the size and cost of the equipment required for the operation. In the further carrying out of the method, the ethylene oxide unabsorbed in the first step of the operation is passed on to the second absorption step wherein it is absorbed in a solution containing an hydration catalyst so that the ethylene oxide is converted into the less volatile glycol. The solution containing the hydration catalyst and the newly formed glycol is then recirculated through the absorption tower in the manner previously described, until the concentration of the glycol in the solution increases to the desired extent. This second step in contrast to the first step is well adapted for the complete removal of ethylene oxide from the gas supplied and involves no extraordinary supply of steam or power for obtaining 98% or more recovery of the ethylene oxide as glycol. The main difference between operating the second step of the present process and a process in which the whole of the ethylene oxide produced is converted to glycol is that the rate at which the liquid product of the absorption-hydration system is withdrawn from the process is decreased.

When both olefin oxide and the corresponding glycol are desired as final products of an operation which produces a gas containing the olefin oxide and diluent gases, the present combination of incomplete recovery in one step and a second finishing step, affords a unique method in that each step is designed to carry out an operation for which it is peculiarly adapted, with a resulting over-all economy.

While I have described my process as one using water as the solvent and forming glycol as a derivative, aqueous solvents or non-aqueous solvents such as oils may be used, and other derivatives such as polyglycols, ethers, or other compounds formed from olefin oxides may be formed in place of glycol in the second step.

The method as described affords an excellent commercial and economical procedure for the recovery of olefin oxides from dilute gaseous mixtures. Substantially all possibilities of loss are eliminated, and high efficiency is attained, the cost of operation being the minimum available for the handling of such dilute gaseous mixtures.

Various changes may be made in the procedure and particularly in the details of the apparatus described, without departing from the invention or sacrificing any of the advantages thereof.

I claim:

1. The method of recovering olefin oxides from gaseous mixtures containing them which comprises passing the gaseous mixture into contact with a solvent for the olefin oxide to dissolve and thereby separate olefin oxide, the quantity of solvent and the time of contact between the solvent and the gaseous mixture being such that an appreciable amount of the olefin oxide in the gaseous mixture is not dissolved in the solvent, subjecting the solvent to the action of steam to remove the olefin oxide therefrom, and passing the effluent gaseous mixture containing the remainder of the olefin oxide into contact with water, in the presence of an hydration catalyst, to convert the remainder of the olefin oxide into the corresponding glycol.

2. The method of recovering olefin oxides from gaseous mixtures containing them which comprises passing the gaseous mixture into contact with a solvent for the olefin oxide to dissolve and thereby separate olefin oxide, the quantity of solvent and the time of contact between the solvent and the gaseous mixture being such that an appreciable amount of the olefin oxide in the gaseous mixture is not dissolved in the solvent, subjecting the solvent to the action of steam, at a pressure so low that there is no appreciable condensation of the steam, to remove the olefin oxide therefrom, and passing the effluent gaseous mixture containing the remainder of the olefin oxide into contact with water, in the presence of an hydration catalyst, to convert the remainder of the olefin oxide into the corresponding glycol.

3. The method of recovering olefin oxides from gaseous mixtures containing them which comprises passing the gaseous mixture into contact with a solvent for the olefin oxide to dissolve and thereby separate olefin oxide, the quantity of solvent and the time of contact between the solvent and the gaseous mixture being such that an appreciable amount of the olefin oxide in the gaseous mixture is not dissolved in the solvent, subjecting the solvent to the action of steam to remove the olefin oxide therefrom, passing the effluent gaseous mixture containing the remainder of the olefin oxide into contact with water containing an hydration catalyst to convert the remainder of the olefin oxide into the corresponding glycol, and circulating the water containing the hydration catalyst while continuing to pass the effluent gaseous mixture containing the remainder of the olefin oxide into contact therewith until the concentration of glycol therein is sufficient to permit effective recovery thereof.

4. The method of recovering olefin oxides from gaseous mixtures containing them which comprises passing the gaseous mixture into contact with a solvent for the olefin oxide to dissolve and thereby separate olefin oxide, the quantity of solvent and the time of contact between the solvent and the gaseous mixture being such that an appreciable amount of the olefin oxide in the gaseous mixture is not dissolved in the solvent, subjecting the solvent to the action of steam, at a pressure so low that there is no appreciable condensation of the steam, to remove the olefin oxide therefrom, passing the effluent gaseous mixture containing the remainder of the olefin oxide into contact with water containing an hydration catalyst to convert the remainder of the olefin oxide into the corresponding glycol, and circulating the water containing the hydration catalyst while continuing to pass the effluent gaseous mixture containing the remainder of the olefin oxide into contact therewith until the concentration of glycol therein is sufficient to permit effective recovery thereof.

FREDERICK R. BALCAR.